R. H. MOORE & R. P. SAFFOLD.
AUTOMATIC FILM SHIFTER FOR CAMERAS.
APPLICATION FILED OCT. 15, 1914.

1,232,828.

Patented July 10, 1917.
3 SHEETS—SHEET 1.

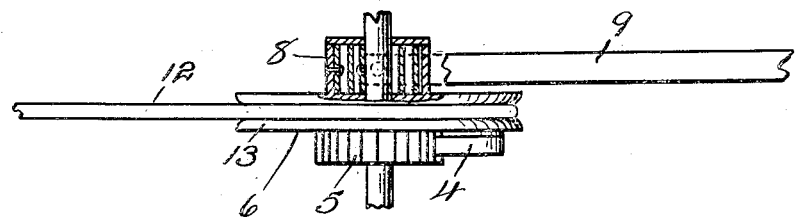
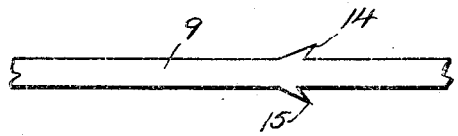
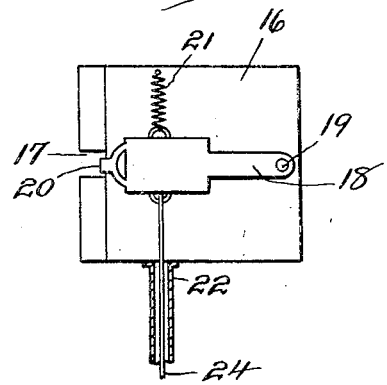
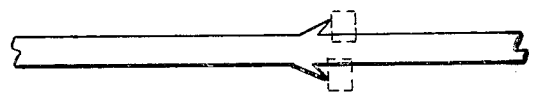
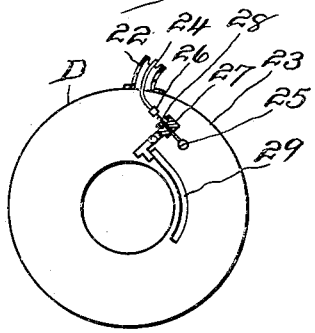

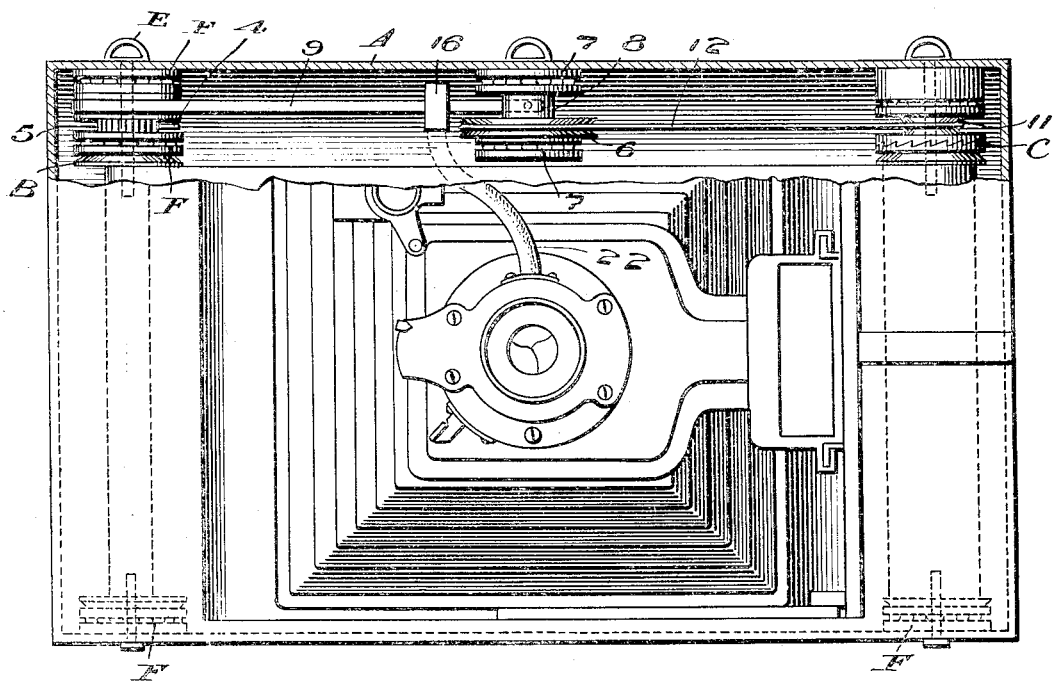

UNITED STATES PATENT OFFICE.

RALPH H. MOORE AND RAY P. SAFFOLD, OF DOUGLAS, ARIZONA.

AUTOMATIC FILM-SHIFTER FOR CAMERAS.

1,232,828.  Specification of Letters Patent.  Patented July 10, 1917.

Application filed October 15, 1914. Serial No 866,877.

*To all whom it may concern:*

Be it known that we, RALPH H. MOORE and RAY P. SAFFOLD, citizens of the United States, residing at Douglas, in the county of Cochise and State of Arizona, have invented certain new and useful Improvements in Automatic Film-Shifters for Cameras; and we do hereby declare the following to be a full, clear, and exact description of the invention, such as will enable others skilled in the art to which it appertains to make and use the same.

This invention relates to improvements in cameras and more particularly to that type of camera employing a film strip adapted to be fed or wound intermittently from one spool to another of a pair of spools carried at opposite sides or ends of the camera.

An object of the invention is to provide an automatic film feeding means which will successively feed the desired length of film in a manner to eliminate the accidental over-running or over-lapping of the succeeding picture film sections so common with the manual feeding means at present in use.

A further object of the invention is to provide an automatic film feeding means which is operable simultaneously with the operation of the shutter so that the desired length of film is moved into position for the taking of a succeeding picture whereby to eliminate the possibility of superposing one picture over another as is now of common occurrence in the operation of the aforesaid manual film feeding means, due to the failure of the operator to move a new film section into position prior to the taking of the succeeding exposure.

Another object of the invention is to provide an automatic film feeding device for cameras consisting of a spring tension applied to the film carrying spools in a manner to intermittently feed a desired length of the film into proper position, the same being releasable simultaneously with the actuation of the shutter.

With these objects in view, and others, which will be hereinafter more fully described, the invention is fully described and pointed out in the following specification, claims appended thereto, and illustrated in the accompanying drawings, which form part of this specification:

Fig. 3 is a detailed view, partly in section, of the film actuating mechanism.

Fig. 4 is a fragmentary plan view of the feed ribbon in detail.

Fig. 5 is a fragmentary side elevation of the feed ribbon in detail.

Fig. 6 is a detailed view of the feed ribbon release mechanism operable by the camera shutter.

Fig. 7 is a fragmentary plan view of the feed ribbon and the coöperating release means in detail.

Fig. 8 is a detailed view of the camera shutter and the feed ribbon releasing mechanism in position to be actuated upon the operation of the shutter.

Fig. 9 is a front elevation, partly in section, of a conventional form of camera showing the invention applied thereto.

Figure 1:
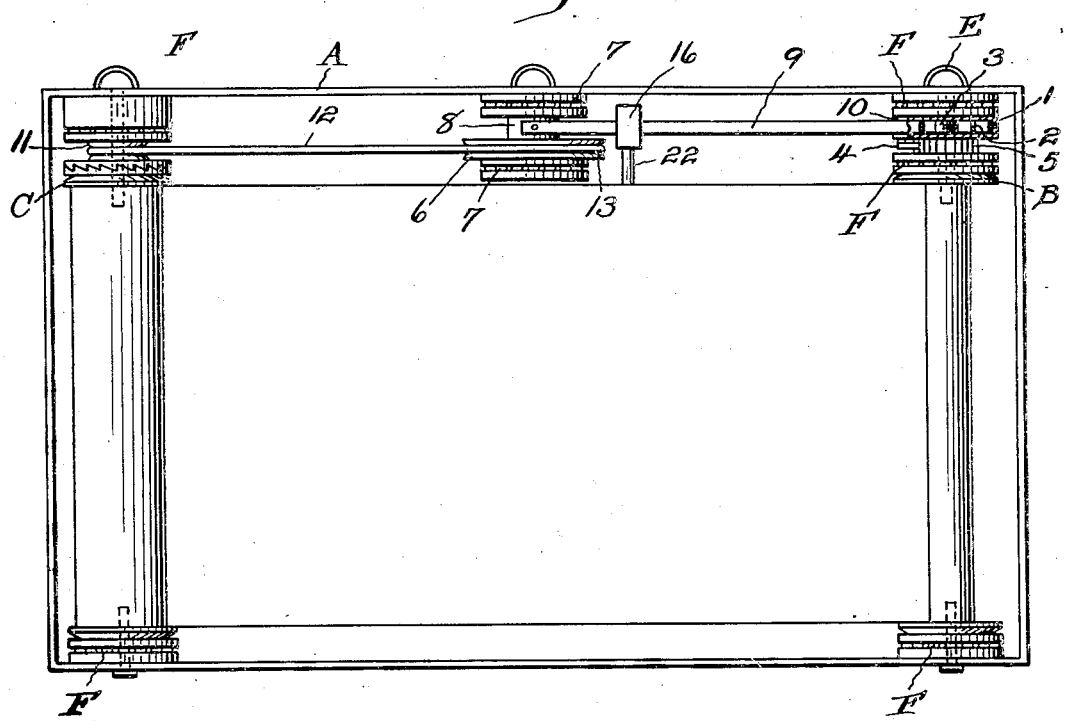
Figure 1 is a rear elevation of the preferred embodiment of the invention as applied to a camera of well known construction.
Figure 2:
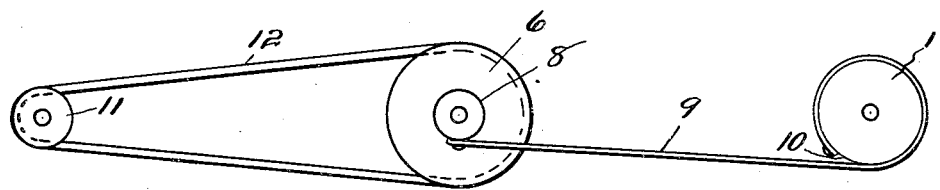
Fig. 2 is a diagrammatical view of the invention showing its specific application to the film winding spools.

Referring to the accompanying drawings, wherein like characters of reference refer to corresponding parts in the several views, A denotes a camera body of usual construction, B the film winding spool, C the film supply spool, and D the shutter of the camera. The usual key E is provided for manually operating the winding spool B in case of accidental injury to the automatic film feeding means. The spools B and C are preferably supported at their opposite ends in ball bearings, F, which, however, may be omitted, if desired.

Mounted upon one end of the winding spool B, preferably at that end of the spool engaged by the key E, is a rotatable housing 1 which incloses a coiled spring 2, the inner end of the spring being secured to the spool spindle 3 while the outer end is secured to the housing 1. A pawl 4 is provided to engage the ratchet teeth 5 whereby tension may be applied to the spring 2 by the rotation of the housing 1.

At a point intermediate the winding spool B and the supply spool C is mounted a compound pulley 6 supported in suitable ball bearings 7, to the smaller face 8 of which pulley 6, is secured one end of a flat band 9, preferably of steel, and upon which face 8 said band is adapted to be wound during the feeding of the film. The other end of the band 12 is secured to the face 10 of the rotatable housing 1.

The supply spool C is provided with a pulley 11 which is driven by means of a belt 12 passed over the large pulley face 13 of the compound pulley 6.

The flat band 9 is provided with a series of lugs or clutches arranged in pairs corresponding in number to the number of picture sections of the film strip, the lugs of a pair being designated by 14 and 15 and disposed one slightly in advance of the other at opposite sides of the band.

The shutter controlled automatic release for the film feeding mechanism above described comprises a metal plate 16 secured to the camera body A, having one edge formed to provide a groove or guide 17 for the band 9. A lever 18 is pivoted at 19 and lies centrally of the plate 16 with its forward end 20 slightly overlying the guide 17. A spring 21 is secured at one end to the plate 16 and engages the lever 18 at its other end to hold the latter normally in the path of the band 9 and in engagement with the lug 14 of one of the pairs then in operative position.

A flexible casing 22 connects the plate 16 and the shutter frame 23 and is secured thereto. A fine wire 24 is secured to the lever 18 and is passed through the flexible casing 22 and connects to the shutter D at 25. A stop 26 is placed upon the wire 24 and is adapted to be alternately engaged by and disengaged from the catch 27 of spring metal, with the opening and closing movement of the shutter and which is provided with a depression 28 to retain the stop 26 when the same is moved into engagement therewith. A cam member 29 is formed with or secured to the shutter 25 and is so arranged to act upon the catch 27 to release the stop 26 and permit the same to return to normal position.

The operation of the mechanism is as follows: The film roll having been placed in the camera in the manner as now employed and trained through the same by the key E until the first film (No. 1) is in proper position as is indicated with the usual markings appearing in the small sight opening located, generally on the back of the camera body, the flat band 9 is wound upon the small face 8 of the compound pulley 6, and the coiled spring 2 is given the required tension by rotating the housing 1.

In taking a picture, just as the shutter D begins to open, a pull is imparted to the wire 24 which disengages the lever 18 from the first lug 14 and sets the apparatus in position for automatic release by reason of the lever engaging with the second lug 15, the stop 26 being also moved into engagement with the catch 27. As the shutter closes the cam 29 actuates the catch 27 to release the stop 26 so that the tension on the wire 24 is relieved, and the lever 18 disengages the lug 15 thereby permitting free movement to the band 9 which acts to revolve the compound pulley 6 driving the supply spool C through the belt 12 connected to the pulley 11. The film is fed forward bringing the film section No. 2 into proper position, at which point lug 14, of the second pair of such lugs, is engaged by the lever 18 thereby setting the apparatus for the taking of the second picture. It being understood that the distance between each pair of lugs 14 and 15 is the equivalent to the required length of film to be fed for each succeeding picture.

When the last exposure is made, or picture taken, the film is wound off the supply spool C and upon the winding spool B which is then removed from the camera as is now the practice.

Fig. 3 shows in detail a re-arrangement of the parts heretofore described, in which the rotatable housing 1, and the coiled spring 2, (Fig. 1) are mounted upon or formed with the compound pulley 6, instead of upon the winding spool B.

It is therefore to be fully understood that similar re-arrangements of the parts or modifications may be resorted to without departing from the spirit of the present invention.

Having thus fully described our invention, what we claim is:

1. In a camera, the combination with a shutter mechanism, of a supply spool fixed against bodily movement, a film receiving spool, and automatic means connected to said mechanism and said spools for feeding successive picture sections to the point of exposure, immediately after the operation of the shutter.

2. In a camera, the combination with a shutter, of a film supply spool fixed against bodily movement, a film receiving spool, means connected to said spools for feeding successive picture sections of a film strip to the point of exposure, and means actuated by the shutter for setting and releasing said film feeding means.

3. In a camera, the combination with a shutter, of a film supply spool fixed against bodily movement, a film receiving spool, automatic means connected to said spools for feeding successive sections of a film strip to the point of exposure, and means actuated by the shutter for setting and releasing said automatic film feeding means.

4. In a camera, the combination with a shutter, of a film supply spool fixed against bodily movement, a film receiving spool, spring operated means connected to said spools for feeding successive picture sections of a film strip to the point of exposure, and means actuated by the shutter for setting and releasing said spring operated means.

5. In a camera, the combination with a shutter, of a film supply spool fixed against bodily movement, a film receiving spool, means for operating said receiving spool, driving means connecting said supply spool and said receiving spool, and means actuated by the shutter for stopping and releasing said operating means.

6. In a camera, the combination with a shutter, of a film supply spool fixed against bodily movement, a film receiving spool, spring operated means for actuating said receiving spool, driving means connecting said supply spool and said receiving spool, and means actuated by the shutter for stopping and releasing said spring operated means.

7. An automatic film feeding mechanism comprising, a film supply spool fixed against bodily movement and a film receiving spool mounted in annular bearings, a shutter, and power means mounted intermediate said supply spool and said receiving spool for feeding successive picture sections of a film strip to the point of exposure immediately after the operation of the shutter.

8. In a camera, a film feeding spool, a film winding spool, spring operated means for actuating said winding spool, a housing for said spring operating means, a compound pulley arranged medially of the feed and winding spools, a band connecting said housing with one face of said compound pulley and adapted to be alternately wound from one to the other, a pulley carried by said feed spool, a driving belt connecting the other face of said compound pulley with said latter pulley, a shutter, and means, actuated by the shutter, for setting and releasing said spring operated means, whereby successive picture sections of a film strip are brought into position for exposure immediately after the closing movement of said shutter.

In testimony whereof we affix our signatures, in presence of two witnesses.

RALPH H. MOORE.
RAY P. SAFFOLD.

Witnesses:
M. E. BUCKELS,
W. BAIRD, Jr.